United States Patent

Hohne et al.

[11] Patent Number: 5,842,661
[45] Date of Patent: Dec. 1, 1998

[54] ARRANGEMENT FOR SETTING THREAD TENSION

[75] Inventors: Hans-Jurgen Hohne, Hainburg; Kresimir Mista, Heusenstamm, both of Germany

[73] Assignee: Karl Mayer Textilmaschinenfabrik GmbH, Obertshausen, Germany

[21] Appl. No.: 907,591

[22] Filed: Aug. 8, 1997

[30] Foreign Application Priority Data

Aug. 17, 1996 [DE] Germany .................. 196 33 256.7

[51] Int. Cl.⁶ ...................... B65H 59/22; B65H 59/12
[52] U.S. Cl. ........................... 242/419.1; 242/150 R; 242/154; 242/419.7
[58] Field of Search ................ 242/150 R, 150 M, 242/154, 419.1, 419.7

[56] References Cited

U.S. PATENT DOCUMENTS

| | | | |
|---|---|---|---|
| 3,650,717 | 3/1972 | Canfield | 65/486 |
| 3,688,958 | 9/1972 | Rydborn | 226/11 |
| 4,880,175 | 11/1989 | Yamauchi et al. | 242/150 M X |
| 4,884,763 | 12/1989 | Rydborn | 242/150 R X |
| 5,056,734 | 10/1991 | Uchida et al. | 242/150 R X |

*Primary Examiner*—Michael Mansen
*Attorney, Agent, or Firm*—Omri M. Behr, Esq.

[57] ABSTRACT

The arrangement can control the pulling tension of a thread 1 during its wind-off or wind-up, from or to a spool 3. The arrangement includes a thread brake 5 having a local portion 6 and a portion 8 movable relative thereto, between which the thread 1 is pulled during the wind-up or wind-off and which provides a frictional force upon thread 1. Furthermore, the arrangement includes an actuator 13 for applying a frictional force applied by thread brake 1 to thread 1 may be controlled. Preferably included is a piezo-electric sensor 14 which may be deformed by the force applied by the thread to the sensor 14. In the prior art, the actuator comprises a setting nut and a spring whose operation is time-consuming. In order to simplify the operation of the actuator 13, in accordance with the present invention, the preferred actuator 13 is piezoelectrically deformable element which is constructed as a unit with sensor 14 and is so connected with the movable portion 8 of the thread brake 5 that the deformation movement of the actuator can be transferred to the movable portion 8 of thread brake 5 and the sensor 14.

18 Claims, 2 Drawing Sheets

ARRANGEMENT FOR SETTING THREAD TENSION

BACKGROUND OF THE INVENTION

1. Field of the Invention

The invention is directed to an arrangement for setting the pulling tension of a thread during its wind-off or wind-on from or to a spool utilizing a thread brake (for example, a local portion and a portion able to move relative thereto, between which the threads are pulled during the wind-off and wind-up and upon which the thread exercises a frictional force), further comprising an actuator by means of which the frictional force acting via the thread brake upon the threads may be adjusted, together with a sensor which converts the force acting upon the sensor into a signal. The area of use of the present invention is for textile machines and the like.

2. Description of Related Art

In a known arrangement of this type (EPO 296 132 A1) the actuator comprises a spring and a nut. By means of the nut on an axis, the spring is pressed against a disk of a disk brake which is displaceably mounted on the axis. Thereby the thread brake is pressed against a piezoelectric sensor fixed on an axis. The sensor in this way measures the force applied to the sensor by the thread fed through the plates, and applies the measuring signal to a monitoring arrangement. The thread tension, dependent upon the frictional force exercised upon the thread brake and dependent upon the thread speed may only be adjusted, in this way, in a time consuming and difficult manner. The adjustment of the thread tension becomes even more time consuming, when one is concerned with a plurality of threads as is the case in a textile machine where all must be set equally and repetitively.

In a further known arrangement of the prior art (EPO 619 261 A1) the actuator similarly comprises a spring. This is pressed against a displaceable disk of a disk brake for the thread by means of a hydraulic and/or pneumatic servomotor via a displaceable housing on the same axis, in order to control the thread tension in dependence upon the measured actual value of the thread tension by means of a sensor separate from the thread brake. Even in this case, the setting of the braking force of the disk brake by means of hydraulic and/or pneumatic servomotor is time consuming and tiresome.

From Swiss Patent 676 704 A5, it is known that the disk of a thread brake may be activated by a piezoelectric actuator (motor).

See also Swiss Patent 422,609, U.S. Pat. No. 4,462,557, and German references: DOS 3734471 A1 and DAS 1 037 930.

An object of the present invention is to provide an arrangement of the prior art, which achieves a simpler and more rapid adjustment of the thread tension.

SUMMARY OF THE INVENTION

In accordance with the illustrative embodiments demonstrating features and advantages of the present invention, there is provided an arrangement for setting the pulling tension of a thread during its wind-off and take-up relative to a spool. The arrangement has a thread brake, including: (a) a local segment, and (b) a movable segment movable relative to the local segment. The movable and the local segments are adapted to permit the thread to be pulled between them during the wind-off and take-up, while exercising a frictional force on the thread. The arrangement also has a unitary means having a pair of longitudinal ends. The unitary means has an actuator and a piezoelectric sensor. The actuator is coupled to the thread brake for adjusting frictional force exercised upon the thread by the thread brake, and includes a piezoelectrically deformable element. The piezoelectric sensor can convert the force applied to the sensor by the thread into an electrical signal. The sensor is combined with the piezoelectrically deformable element into a single unit. The movable segment is connected in the thread brake to allow deforming motion of the actuator that is applied to the movable segment to be transferred onto the thread brake and the sensor.

Arrangements according to the principles of the present invention, can employ an actuator with a piezoelectric deformable element, structured as a unit with the sensor. With the sensor, the movable portion of the disk brake is so connected, that the deformation motion of the actuator is transmitted to the movable part of the thread brake and to the sensor.

In this solution the force may be very rapidly adjusted, for example, via an electrical transmitter via the actuator or with several actuators at the same time.

A particularly simple embodiment of the arrangement exists in that the actuator and the sensor comprise elongated strips of piezoelectric material mounted between elongated, strip-shaped electrodes. The preferred actuator and sensor are fixed on opposite sides of an elongated carrier made of electrically isolating material. By the application of electrical potential to its electrodes the length of this actuator is altered, to simultaneously deform the arrangement comprising the actuator, carrier and the sensor. One end of this arrangement is rigidly affixed and the other end of the arrangement is connected with the movable part of the disk brake. This arrangement extends perpendicularly to the direction of motion of the movable portion of the disk brake. By bending of the arrangement comprising the actuator carrier and sensor, the desired force operates upon the thread brake.

A function generator can be connected to the electrodes of the actuator and generate a predetermined potential upon the electrodes of the actuator. In this way, an automatic setting of the thread tension may be obtained in consideration of the type of thread; for example, its roughness.

In particular, the output potential of a dual input controller can work the input signals of the electrodes of the actuator. The output signal of the sensor may be fed to one of the inputs of the controller and a reference input is provided to the other input. In this manner, it is possible to provide for a feedback control of the braking force of the thread brake in dependence upon the reference input.

Thus, the reference input can be the output variable of a function generator, which generates the reference input; for example, in accordance with a predetermined program corresponding to the desired thread tension for the appropriate thread.

Furthermore, it may be provided that a further thread brake is provided next to the first arrangement, and is connected with a second arrangement that corresponds to the first arrangement. The input variable of the electrodes of the actuator is fed to the second arrangement as a drive potential. The input variable is also fed to an input of the controller through a transfer device whose transfer coefficient is smaller than 1. In this embodiment the second arrangement provides a base-line setting for the thread tension, while the comparison circuit with the other arrangement regulates out small deviations from the base-line setting.

There may be provided a monitoring arrangement to the electrodes of the sensors of the first or the further arrangement. This monitoring arrangement can react and, for example, stop the machine in the event of a thread break or an excessively high tension of the thread.

The actuator of the one and/or the other arrangement can be provided with a further actuator running in the same direction and operating parallel thereto. The forces of these actuators are then additive so that a higher thread tension may be attained than is possible with just one actuator.

It is preferably provided that the potential applied to the actuator electrodes decrease with increasing thread speed. By this alteration of the electrical potential at the actuator electrodes, it is possible to maintain the thread tension almost constant during the wind-up or wind-off process from the lowest to the highest thread speeds.

As a piezoelectric material, one is basically concerned with ceramics.

The one and/or the further thread brake can be a disk brake or a circumferential loop brake.

It is preferably provided that in the use of one or more disk brakes as a thread brake or brakes, the movable disk of the disk brake is separatable for a short time from the running thread, by means of a separating signal fed to a sensor connected with the movable disk or disks, while the signal generator is switched off.

This has the following advantage. In a disk brake the thread runs eccentrically to the axis of rotation of the disk, between the disks, so that the disks which are rotatably mounted on an axis, can be rotated due to the friction between the threads and the disks. The separating space between the disks can however, after a period of time, be so badly contaminated that the disks no longer can rotate. The disks must then be separated by hand, and the space between them cleaned. In accordance with the present invention, this cleaning can operate automatically in a very short time, wherein by raising one of the disks, the thread brake can be automatically cleaned by the thread.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
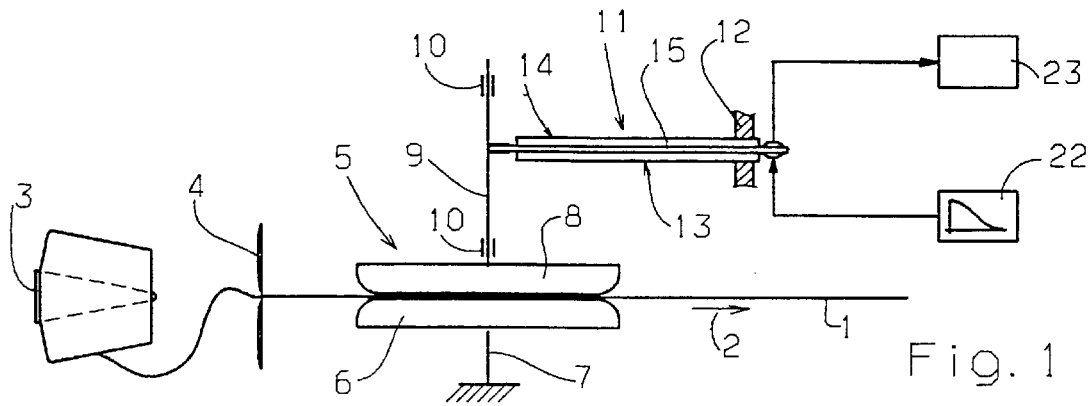
FIG. 1 is a schematic view of a first embodiment of the invention.

In FIG. 1, thread (1) is pulled by a textile machine (not illustrated) in the direction of arrow (2). Thus, thread (1) is wound off from spool (3) and runs through a balloon barrier (4) and then a thread brake (5). The thread brake is a disk brake with a local segment (6) in the form of a disk rotatable about axle (axis) (7) and a movable segment (8), movable perpendicular to the plane of segment (6), in the form of another disk. Segment (6) is fixed in an axial direction on a further axle (axis) (9), but is rotatable about the axis (9).

The axle (9) is axially displaceable together with segment (8), in bearings (10), relative to the plane of segment (6). While axes (7) and (9) run concentrically relative to segments (6) and (8), thread (1) runs eccentrically between segments (6) and (8).

Figure 5:
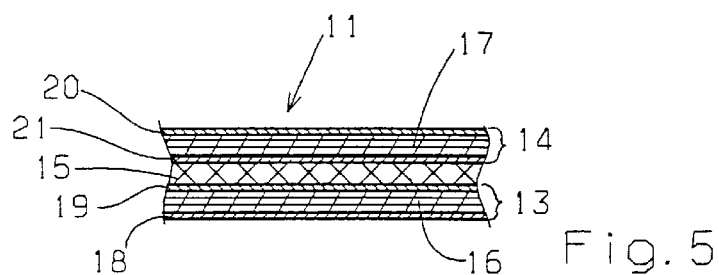
FIG. 5 is an expanded and enlarged, sectional view of the segment of the invention comprising the actuator, the carrier, and the sensor.
Figure 6:
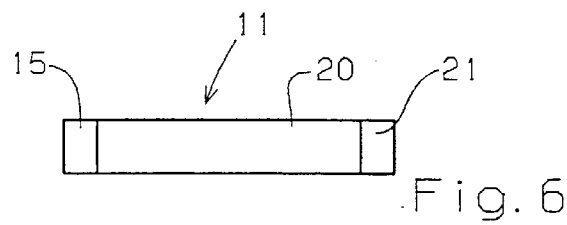
FIG. 6 is a plan view of the arrangement of FIG. 5.

Affixed to axle (9) is one end of an elongated unitary means (11), whose other end is attached to an insulated frame (12). The unitary means (11) comprises an actuator (13) and a sensor (14), which are attached on opposite sides of an elongated strip-shaped carrier (15) of insulating material. FIG. 5 shows an enlarged, sectional view of unitary means (11) and FIG. 6 shows the plan view of unitary means (11) in the ratio of 1:1.

FIG. 5 shows that actuator (13) includes an elongated strip of piezoelectric ceramic (16) and sensor (14) similarly includes an elongated strip of piezoelectric ceramic (17). Combined with the outside of ceramic (16) is an elongated electrode (18) corresponding to ceramic (16). On the inside of ceramic (16) is a correspondingly elongated strip-shaped electrode (19). Similarly on the outside of ceramic (17) and corresponding to ceramic (17), there is provided an elongated, strip-shaped electrode (20). On the inside of ceramic (17) is a correspondingly elongated, strip-shaped electrode (21). The electrodes (19) and (21) are further combined with carrier (15).

At the end of unitary means (11) that is fixed to frame 12, the electrodes (19) and (21) lie exposed on carrier (15), extending beyond the ends of ceramic (16) and (17). The outer electrodes (18) and (20) are also exposed. Galvanically isolated reference or ground potentials (not shown) are separately applied to electrodes (18) and (20). A drive potential is applied to electrode (19) of actuator (13). An electrical potential is taken as a measurement from electrode (21) of sensor (14) during the bending of unitary means (11).

When the electrode (19) of actuator (13) has a drive potential applied thereto, the ceramic (16) shrinks mainly in its longitudinal direction so that the entire unitary means (11) bends in a direction toward the thread brake (5). At the same time, because of the varying roughness and thickness of the thread (1) running through the brake, corresponding and rapidly varying bending of the sensors (14) occur. Consequently, rapidly varying potentials corresponding to this bending will occur between electrodes (21) and (20) of the sensor (14). The unitary means (11) is constructed as a unit comprising the actuator (13), the carrier (15) and the sensor (14).

Further shown in FIG. 1 is a function generator (22), which is so provided or programmed that with increasing speed, its output potential varies according to a predetermined function of thread speed. In this embodiment, the output potential decreases with increasing thread speed (the manner of measuring the speed and application to function generator (22) not being illustrated). The character of the dependence between the output potential of the function generator (22) and the thread speed is determined by the nature of thread (1) (preset or programmed). In this manner, by appropriate change in the electrical potential on the actuator (13), it possible to maintain the thread tension during wind-up and wind-off of thread (1) from the slowest to the fastest thread winding speed, to a substantially constant level.

A monitoring arrangement (23) is connected to electrodes (20) and (21) of sensor (14). In dependence upon the deflection of unitary means (11) under which thread (1) runs, sensor (14) provides a sensor signal, whether thread (1) runs, a thread break has occurred, and/or whether thread (1) exhibits excessive pulling tension. At the same time, the monitoring arrangement (23) can, for example in the event of a thread break, stop the drive of the textile machine. On the other hand it is possible, at high thread tension, to intervene via the function generator (22) and the frictional force of thread brake (5) may be reduced via actuator (13).

Figure 2:
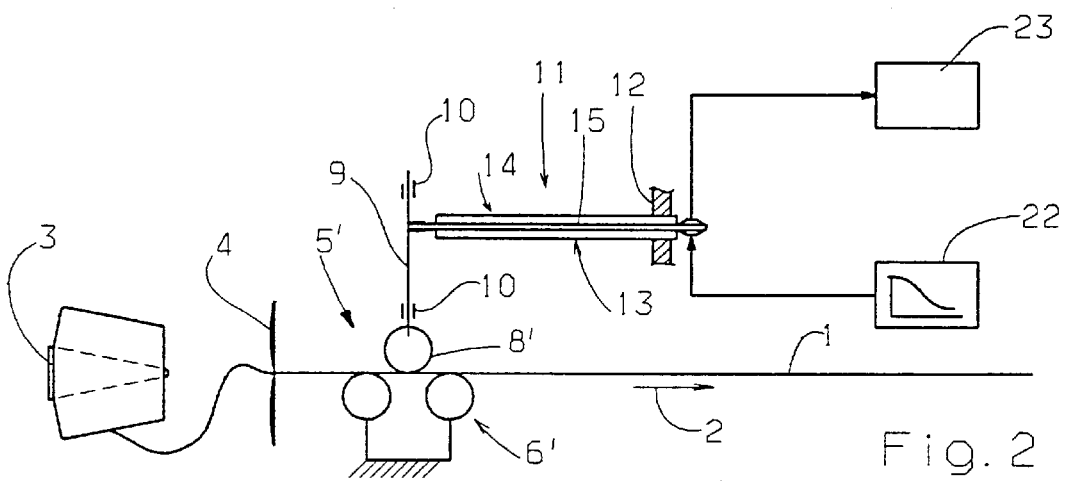
FIG. 2 is a schematic view of a second embodiment of the invention.

The arrangement of FIG. 2 differs from that of FIG. 1 only with respect to the formation of the alternate thread brake (5') whose local (non-reciprocatable axially) segment (6') comprises two parallel and non-rotatable, cylindrical deflectors in the form of rods mounted at the same elevation. The movable deflector (8') is a segment located between the two fixed rods and parallel thereto, and is fixed to the lower end of axis (9). The top of the circumference of the fixed rods (6') and the bottom of the circumference of the movable segment (8') are substantially in a common plane. Thread (1) runs between segments (6') and (8'), wherein the loop angle between thread (1) and rod (6' and 8') and thus the frictional force exercised by thread brake (5') upon thread (1) may be set by displacement of the height position of the movable segment (8') relative to the local segments (6').

Figure 3:
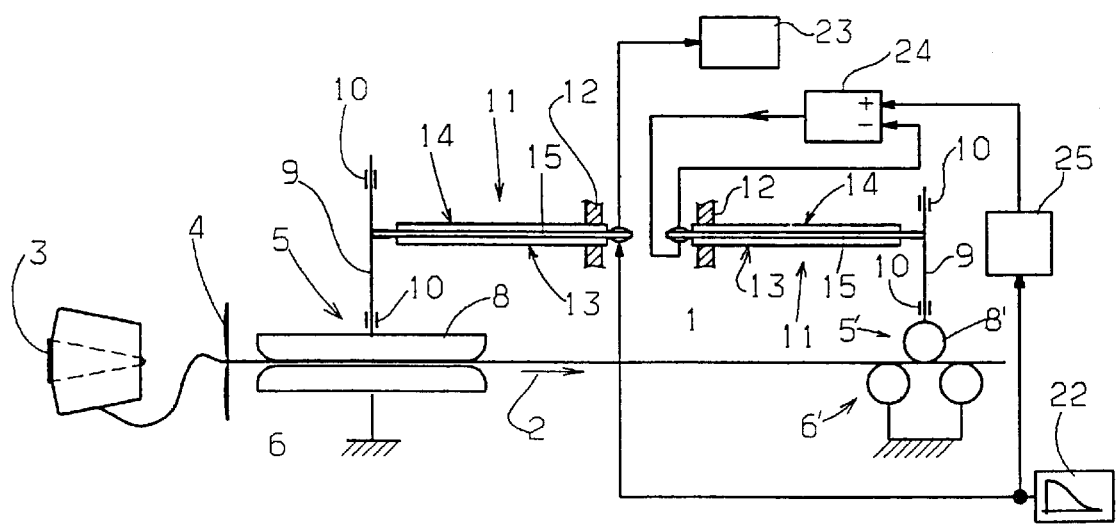
FIG. 3 is a schematic view of a third embodiment of the invention.

In the arrangement of FIG. 3, in addition to the arrangement of FIG. 2, there is provided in running direction (2) of thread (1) behind thread brake (5), another thread brake (5') corresponding to thread brake (5') of FIG. 2. (When one of the brakes of FIG. 3 is referred to as a thread brake, the other may sometimes be referred to as a secondary brake.) Another unitary means (11') is provided with sensor 14' and actuator 13', that is, structure essentially the same as the means (11) of FIG. 2. (When one of the means 11 or 11' of FIG. 3 is referred to as a unitary means, the other may sometimes be referred to as the secondary means.)

The output potential of the sensor (14') of the arrangement (11') is provided to an inverting input (–) of a controller (24), whose output is connected to the actuator (13') of the means (11'). Further, the output potential of the function generator (22) is fed to the non-inverting input (+) of controller (24) as an input variable via a relay repeater member (25), which has a transfer ratio (gain), which is substantially less than one. The output variable of the transfer member (25) has a value of approximately 2–10% of that of its reference input.

In this arrangement the first unitary means (11), acting through the thus activated thread brake (5), applies a relatively high thread tension, corresponding to the total reference input of the function generator (target value provider), to set a base thread tension. The other unitary means (11') applies a lower, additional thread tension, corresponding to the transfer ratio of the transfer member (25), via controller (24) and the thread brake (5'). Thus, small changes in the thread tension can be relatively rapidly regulated out through the control arrangements (24, 11', 5' and 25).

Figure 4:
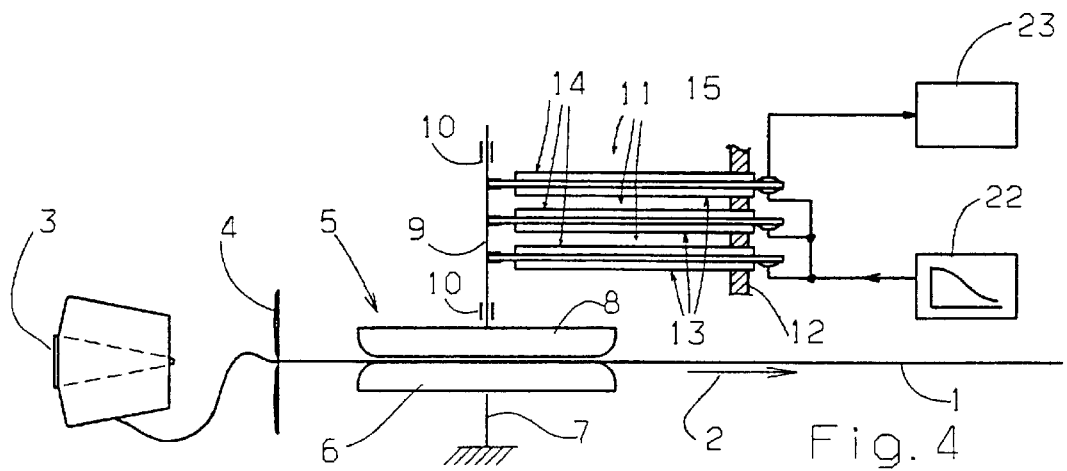
FIG. 4 is a schematic view of a forth embodiment of the invention.

The arrangement in accordance with FIG. 4 differs from that of FIG. 1 in that additional unitary means (11), specifically three unitary means (11), are provided in parallel. These unitary means (11) have essentially the same structure. All the actuators (13) of all the unitary means (11), are driven in parallel. (Additional actuators are sometimes referred to herein as parallel means.) In contrast to the actuators (13), the electrodes of only one of the sensors (14) are connected with a monitoring arrangement (23). In this arrangement, it is possible to set higher thread tensions with the same output potential of the function generator (22).

A plurality of such unitary means (11) can be used in place of the unitary means (11) of FIG. 1 or 2, or in place of one or more of the two unitary means (11) in accordance with FIG. 3. Furthermore, it is possible in the arrangement of FIG. 3, to reverse the order of thread brakes (5 and 5') or to utilize the same thread brakes (5 or 5'). Furthermore, in the arrangement of FIG. 3, the control arrangement can be provided with a function generator (22) wherein the remaining portion, including the transfer member (25) may be omitted. However, in this case, it is not possible to work with high thread speeds, if it is desired to rapidly smooth out changes in the thread tension.

Furthermore, the monitoring arrangement (23) can, if desired, be attached to sensor (14) which is attached to the unitary means (11) in the control arrangement.

In the event of a fouling of the thread brake (5) between the disks (6) and (8), the function generator (22) can be disconnected before changing the mode of operation of the sensor (14). At this time the input of the monitoring arrangement (23) can be switched to a constant signal, simulating a thread run. Then a briefly applied separating signal can cause disk (8) to be separated from running thread (1), so that the thread brake (5) can be automatically cleaned by the running thread itself.

Figure 7:
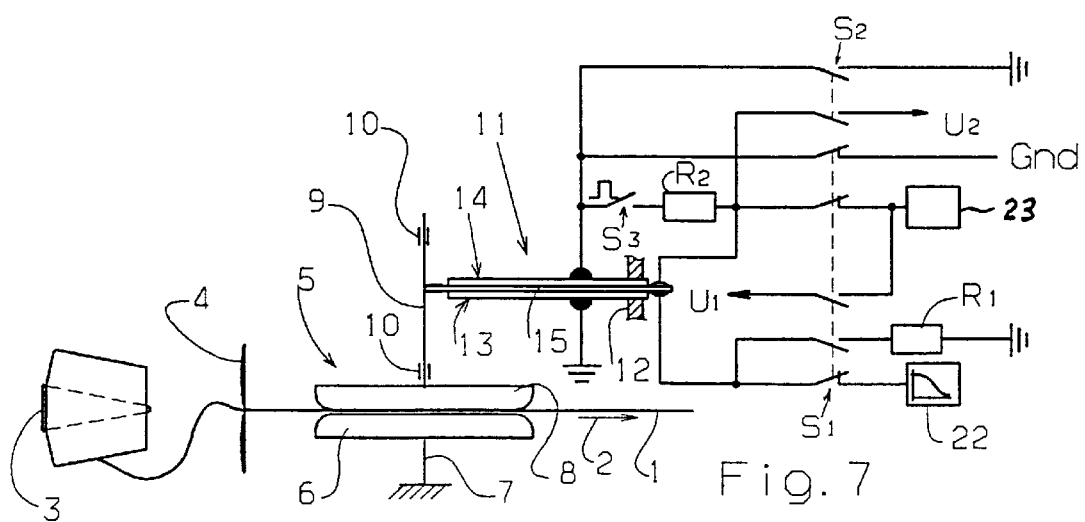
FIG. 7 is a further embodiment that is an alternate to the arrangement of FIG. 1.

For this purpose, the arrangement of FIG. 7 is especially suitable. This contains the same structural features as the arrangement of FIG. 1 and in addition thereto, three switches ($S_1$, $S_2$ and $S_3$), as well as two ohmic resistors ($R_1$ and $R_2$). The electrode (19) (FIG. 5) of the actuator (13) is connected by either (a) a normally closed contact of switch ($S_1$) to the output of function generator (22), or a normally-open contact of switch ($S_1$) through resistor ($R_1$) to ground.

The electrode (21) (FIG. 5) of sensor (14) is connected by either (a) a normally closed contact of switch ($S_1$) to the input of monitoring arrangement (23), or (b) a normally open contact of switch ($S_1$) to a thread-run-signal-simulating potential ($U_2$). Further, the electrode (21) of sensor (14) is directly connected to resistor ($R_2$) and through normally open contacts of switch ($S_1$) to a drive potential ($U_2$) for sensor (14) of about 220 volts. The electrode (20) (FIG. 5) of sensor (14) is connected: (a) via another normally closed contact of switch ($S_1$), to a reference potential (Gnd), galvanically separated from the ground potential of actuator (13), and (b) via a normally open contact of switch ($S_2$) to ground.

In order to clean the thread brake (5) in accordance with FIG. 7, witch (S1) is activated. Thus, the actuator (13) is disconnected from the unction generator (22) and the sensor (14) is disconnected from the monitoring arrangement (23). Also, the actuator (13) is short-circuited over resistor ($R_1$). At the same time, the potential ($U_1$) is fed to the monitoring arrangement (23) as a thread run signal, and the electrode (20) is disconnected from the reference potential (Gnd).

Thereafter, switch ($S_2$) is activated and the sensor (14) is connected to the drive potential ($U_2$). The sensor (14) in this case operates as actuator and bends the unitary means (11) upwardly so that the disk (8) is lifted from the thread (1). The thread (1) then cleans the thread brake (5). After the lapse of a predetermined brief time, the switch ($S_2$) is again switched into the illustrated normal position and the switch ($S_3$) is briefly closed. Thus, the sensor (14) is discharged over resistor ($R_2$). Subsequently, the switch ($S_1$) is again switched into the illustrated position so that the thread brake (5) is again operative as such, in dependence upon the output potential of function generator (22).

Instead of being mechanical as illustrated, switches ($S_1$, $S_2$ and $S_3$) can also be constructed electronically. Furthermore switches ($S_1$) through ($S_3$) and resistors ($R_1$) and ($R_2$) can also be used for the cleaning of thread brake (5) in the arrangement of FIG. 3, wherein during the cleaning step the regulating arrangement is taken out of action.

Obviously, many modifications and variations of the present invention are possible in light of the above teachings. It is therefore to be understood that within the scope of the appended claims, the invention may be practiced otherwise than as specifically described.

We claim:

1. Arrangement for setting the pulling tension of a thread during its wind-off and take-up relative to a spool, comprising:
   a thread brake including: (a) a local segment, and (b) a movable segment movable relative to said local segment, the movable and the local segments being adapted to permit the thread to be pulled between them during the wind-off and take-up, while exercising a frictional force on the thread; and
   a unitary means having a pair of longitudinal ends and including:
   (a) an actuator having electrodes coupled to the thread brake for adjusting frictional force exercised upon the thread by the thread brake, and including a piezoelectrically deformable element; and
   (b) a piezoelectric sensor having electrodes for converting the force applied to the sensor by the thread into an electrical signal, said sensor being combined with said piezoelectrically deformable element into a single unit, the movable segment being connected in the thread brake to allow deforming motion of the actuator that is applied to the movable segment to be transferred onto the thread brake and the sensor.

2. Arrangement in accordance with claim 1 comprising:
   a longitudinally extending carrier of electrically isolating material that extends in a longitudinal direction, the actuator being supported by said carrier on one side of said carrier, an opposite side thereof supporting the sensor, the actuator and the sensor each including:
   (a) a longitudinal pair of strips of electrodes, and
   (b) a longitudinally extended strip of piezoelectric material sandwiched between said pair of strips of electrodes, the actuator being operable in response to application of an electric potential on the electrodes of the actuator to cause simultaneous deflection of the actuator, the carrier, and the sensor, one longitudinal end of the unitary means being immovably fixed, the other longitudinal end of the unitary means being connected to the movable segment of the thread brake, the movable segment of the thread brake being movable in a direction transverse to the unitary means.

3. Arrangement in accordance with claim 2 comprising:
   a function generator connected to the electrodes of the actuator for providing thereto a predetermined potential.

4. Arrangement in accordance with claim 2 comprising:
   a dual-input controller for providing comparative drive signals to the electrodes of the actuator, the electrical signal produced by the sensor being coupled to one input of the controller, whose other input is adapted to be driven by a signal corresponding to a guidance signal.

5. Arrangement in accordance with claim 4 comprising:
   a function generator connected to the controller for providing thereto said guidance signal.

6. Arrangement in accordance with one of claim 5 wherein the function generator is operable to reduce the drive to the electrodes of the actuator in response to increasing thread speed.

7. Arrangement in accordance with claim 4 comprising:
   a secondary brake provided upstream of said thread brake for exercising a frictional force on the thread;
   a secondary means including:
   (a) an actuating means coupled to the secondary brake for adjusting frictional force exercised upon the thread by the secondary brake, and including a pair of secondary electrodes and a piezoelectrically deformable element sandwiched between said secondary electrodes, and
   (b) a sensing means for converting the force applied to the sensing means by the thread into a secondary signal, said sensing means being combined with said actuating means into a single unit, the guidance signal being further applied to the secondary electrodes of the actuating means as drive potential; and
   a repeater relay member adapted to transfer said guidance signal to said dual-input controller with a gain of less than one.

8. Arrangement in accordance with claim 7 comprising:
   a monitoring arrangement connected to the sensing means of the secondary means.

9. Arrangement in accordance with claim 7 comprising:
   a parallel means coupled to the actuating means to work constructively therewith for adjusting frictional force exercised upon the thread by the secondary brake.

10. Arrangement in accordance with claim 1 comprising:
    a function generator connected to the electrodes of the actuator for providing thereto a predetermined potential.

11. Arrangement in accordance with one of claim 10 wherein the function generator is operable to reduce the drive to the electrodes of the actuator in response to increasing thread speed.

12. Arrangement in accordance with claim 11 wherein the piezoelectric material is a ceramic.

13. Arrangement in accordance with claim 10 comprising:
    means for separating the movable segment of the thread brake by applying a brief separating signal to the sensor to move it and the movable segment, while the function generator is switched off, so that debris can be cleared.

14. Arrangement in accordance with claim 1 comprising:
    a monitoring arrangement connected to the strips of electrodes of the sensor of the unitary means.

15. Arrangement in accordance with claim 1 comprising:
    a parallel means coupled to the actuator to work constructively therewith for adjusting frictional force exercised upon the thread by the thread brake.

16. Arrangement in accordance with claim 1 wherein the piezoelectric material is a ceramic.

17. Arrangement in accordance with claim 1 wherein the thread brake comprises:
    a rotatable pair of braking disks.

18. Arrangement in accordance with claim 1 wherein the thread brake comprises:
    an opposing pair of deflectors to adjustably direct the thread in a loop.

* * * * *